(12) United States Patent
Kobayashi (10) Patent No.: US 7,126,888 B2
(45) Date of Patent: Oct. 24, 2006

(54) OPTICAL PICKUP APPARATUS FOR DETECTING A FOCUS-ERROR SIGNAL USING A SPOT SIZE DETECTION METHOD

(75) Inventor: Takashi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/468,588

(22) PCT Filed: Dec. 18, 2002

(86) PCT No.: PCT/JP02/13227

§ 371 (c)(1),
(2), (4) Date: Aug. 25, 2004

(87) PCT Pub. No.: WO03/054866

PCT Pub. Date: Jul. 3, 2003

(65) Prior Publication Data

US 2005/0002014 A1    Jan. 6, 2005

(30) Foreign Application Priority Data

Dec. 20, 2001 (JP) .............................. 2001-387056

(51) Int. Cl.
*G11B 7/00* (2006.01)
(52) U.S. Cl. ................................ 369/44.23; 369/112.03

(58) Field of Classification Search ..................... None
See application file for complete search history.

(56) References Cited

U.S. PATENT DOCUMENTS 5,408,450 A * 4/1995 Nagahama et al. ...... 369/44.12

FOREIGN PATENT DOCUMENTS

JP    2000-235716 A    8/2000

* cited by examiner

*Primary Examiner*—Thang V. Tran
*Assistant Examiner*—Joseph Haley
(74) *Attorney, Agent, or Firm*—Wolf, Greenfield, & Sacks, P.C.

(57) ABSTRACT

An optical pickup apparatus for detecting a symmetric S-shaped signal to obtain a focus-error signal by an SSD method for stability in operation is provided. In an optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, the position of the light-receiving device section is set to the position offset closer to the diffraction element from the focal position of the 0 order light passing through the diffraction element.

4 Claims, 8 Drawing Sheets

OPTICAL PICKUP APPARATUS FOR DETECTING A FOCUS-ERROR SIGNAL USING A SPOT SIZE DETECTION METHOD

TECHNICAL FIELD

The present invention relates to an optical pickup apparatus for detecting a focus-error signal by a spot size detection (SSD) method using diffracted light caused by a diffraction element.

BACKGROUND ART

Optical pickup apparatuses for detecting a focus-error signal by a spot size detection method (SSD method) using diffracted light caused by a diffraction element are known. Such an optical pickup apparatus is described with reference to FIGS. 6 through 8.

Figure 6:
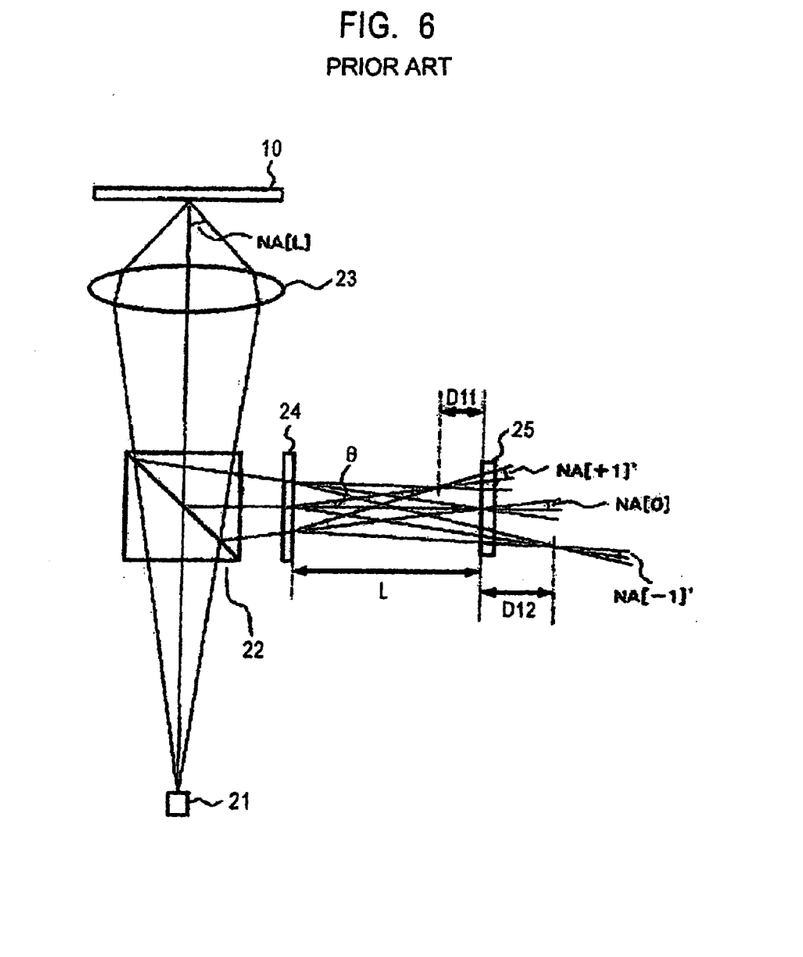
FIG. 6 is a diagram illustrating the structure of an optical pickup apparatus of the related art.

FIG. 6 illustrates an example structure of an optical pickup apparatus for detecting a focus-error signal by an SSD method.

A laser beam emitted from a laser light source 21 such as a laser diode reaches an objective lens 23 through a beam splitter 22, and is irradiated via the objective lens 23 onto an information recording surface of an optical recording medium 10 such as an optical disc.

The light reflected from the optical recording medium 10 returns to the beam splitter 22 through the objective lens 23, the optical path thereof being refracted by the beam splitter 22, and is directed to a diffraction element 24.

The reflected light is divided by the diffraction element 24 into the 0 order light passing therethrough, and +1 order light (diffracted light) and −1 order light (diffracted light) diffracted by the diffraction element 24.

The 0 order light, the +1 order light, and the −1 order light reach a light-receiving device section 25.

Figure 8:
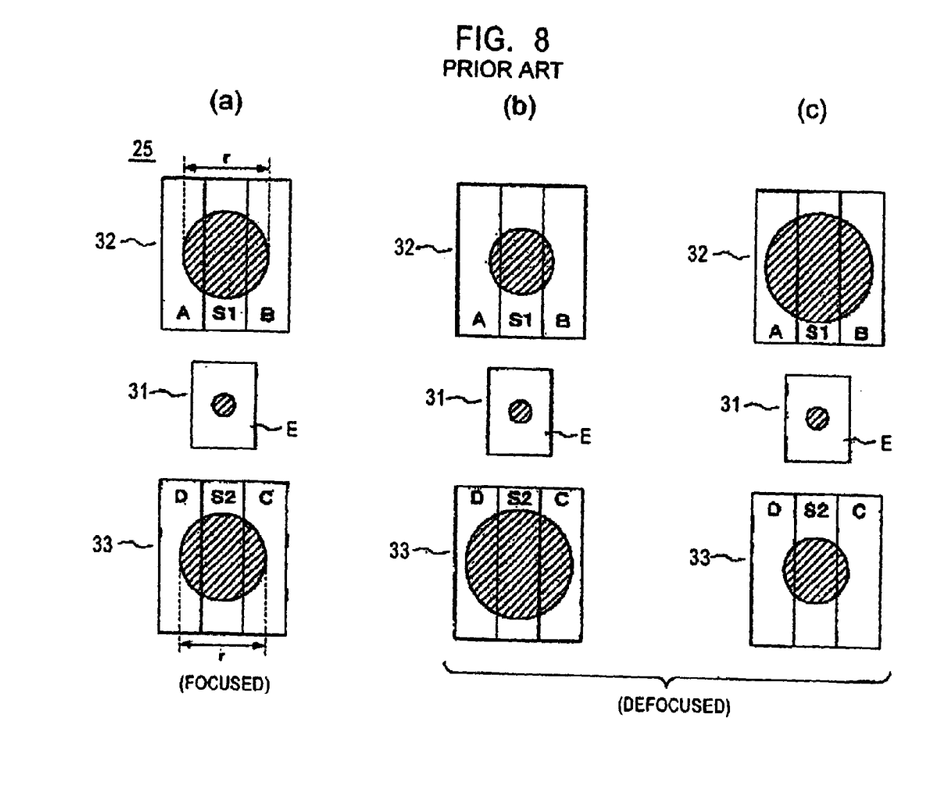
FIG. 8 is a diagram illustrating a light-receiving device in a light-receiving device section of the optical pickup apparatus of the related art.

In the light-receiving device section 25, for example, light-receiving patterns shown in FIG. 8 are formed.

A light-receiving device 31 has a light-receiving region E corresponding to the 0 order light.

A light-receiving device 32 has three divided light-receiving regions A, S1, and B, and corresponds to the +1 order light.

A light-receiving device 33 also has three divided light-receiving regions C, S2, and D, and corresponds to the −1 order light.

Each of the light-receiving regions E, A, S1, B, C, S2, and D of the light-receiving devices 31, 32, and 33 outputs an electrical signal having a current level corresponding to the light intensity of the incident light.

The electrical signal output from each of the light-receiving devices 31, 32, and 33 is supplied to a matrix amp (not shown) for processing, such as current-to-voltage conversion, amplification, and matrix calculation, thereby generating a required signal.

That is, a playback signal, focus-error signal, tracking error signal, etc., corresponding to the information recorded in the optical recording medium 10 are generated.

The objective lens 23 is held by a two-axis mechanism (not shown) having a focus coil and a tracking coil so as to be displaceable in the near-and-apart direction with respect to the optical recording medium 10 (focusing direction) and in the direction transverse to the track orientation of the optical recording medium (tracking direction).

A focus drive signal is generated by a servo circuit (not shown) based on the focus-error signal to drive the focus coil of the two-axis mechanism, so that the objective lens 23 is driven in the focusing direction so as to be focused with respect to the optical recording medium 10.

A tracking drive signal is further generated by the servo circuit based on the tracking error signal to drive the tracking coil of the two-axis mechanism, so that the objective lens 23 is driven in the tracking direction so as to track with respect to the optical recording medium 10.

In the SSD method, the focus-error signal is generated according to the spot size of the diffracted light.

In the focused state shown in FIG. 8(a), the spot size of the +1 order light incident on the light-receiving device 32 is equivalent to the spot size of the −1 order light incident on the light-receiving device 33.

On the other hand, in the defocused state where the objective lens 23 is too close to or too far from the optical recording medium 10, as shown in FIGS. 8(b) and 8(c), the spot size of the +1 order light incident on the light-receiving device 32 is different from the spot size of the −1 order light incident on the light-receiving device 33.

Accordingly, by comparing the spot sizes on the light-receiving devices 32 and 33, the focus-error signal can be generated.

More specifically, the focus-error signal is generated by, in the subsequent matrix amp, calculating (A+B+S2)−(C+D+S1) on the outputs of the light-receiving regions A, S1, B, C, S2, and D.

Figure 7:
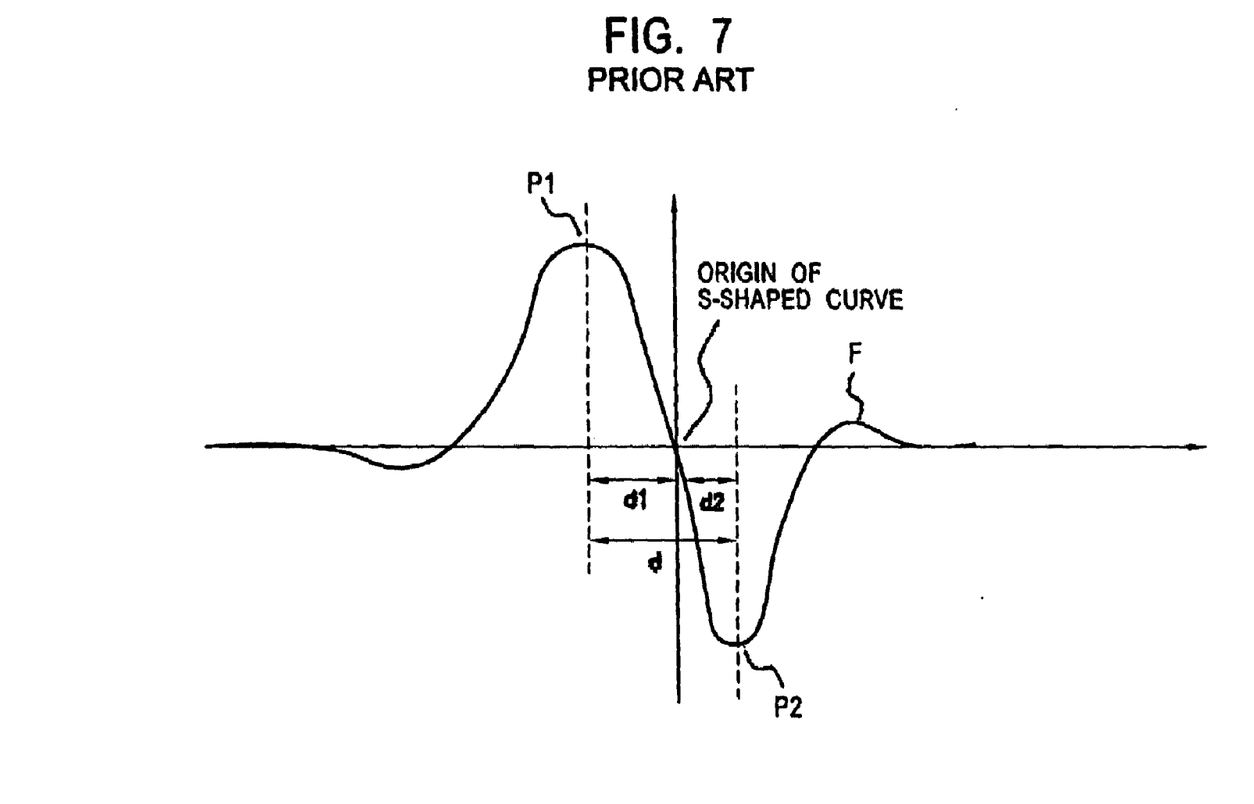
FIG. 7 is a diagram illustrating a focus-error signal obtained by the optical pickup apparatus of the related art.

In general, when the objective lens 23 moves from the position most distant from the optical recording medium 10 to the position closest thereto, as known in the art, in the focus-error signal, a so-called S-shaped curve shown in FIG. 7 is observed in the vicinity of the focused position.

A substantially linear region from peak P1 to peak P2 in the curve corresponds to a so-called in-focus region. In basic operation, when the objective lens 23 is positioned within the in-focus region, a focus servo controls the position of the objective lens 23 to be brought to the position of the origin of the S-shaped curve (i.e., the position where focus error=0) based on the focus-error signal.

As shown in FIG. 7, it is assumed herein that the distance of the in-focus region of the S-shaped signal is indicated by d. In other words, "d" is defined as the displacement distance of the optical recording medium (the distance by which the optical recording medium changes with respect to the position of the objective lens) when the S-shaped signal varies from the peak P1 to the peak P2.

Furthermore, one-side in-focus regions d1 and d2 of the S-shaped curve with respect to the origin of the S-shaped curve are defined as the displacement distances of the optical recording medium when the S-shaped signal goes from the origin of the S-shaped curve to the peaks P1 and P2 of the S-shaped curve, respectively. Then, the following equation holds true:

$$d = d1 + d2 \qquad \text{Formula (1)}$$

The origin of the S-shaped curve coincides with the focal position on the optical recording medium.

This relationship is established, in the standard SSD method, when the diffracted light (the +1 order light and the −1 order light) diffracted by the diffraction element 24 has the same spot diameter r, as shown in FIG. 8(a), resulting in substantial coincidence with the focal position of the 0 order light (strictly speaking, however, it is shifted towards the diffraction element 24 by $L \cdot \cos\theta$, where $\theta$ denotes the angle of diffraction and L denotes the distance between the diffraction element 24 and the light-receiving device section 25).

It is assumed herein that the NA (numerical aperture) of the objective lens 23 is indicated by NA[L]. It is further assumed that the NA of the 0 order light in the light focused at the light-receiving device section 25 which passes through the diffraction element 24 is indicated by NA[0]. It is still further assumed that the NAs of the +1 order light and the −1 order light diffracted by the diffraction element 24 are indicated by NA[+1]' and NA[−1]', respectively.

It is also assumed that the NAs are so small that the following approximation applies: NA=sin θ=tan θ=θ.

Then, the following relationship is obtained:

$$NA[-1]' < NA[+1]' \quad \text{Formula (2)}$$

Thus, the following relationship holds true:

$$NA[-1]' + NA[+1]' = 2 \cdot NA[L] \quad \text{Formula (3)}$$

As shown in FIG. 6, the distances from the position of the light-receiving device section 25 (the focal position of the 0 order light) to the focal positions of the diffracted light (the +1 order light and the −1 order light) diffracted by the diffraction element 24 are indicated by D11 and D12, respectively.

Then, the above-noted one-side in-focus regions d1 and d2 of the S-shaped curve can be approximated as follows:

$$d1 = \{(1/2) \cdot D11 \cdot (NA[+1]')^2\}/(NA[L])^2 \quad \text{Formula (4)}$$

$$d2 = \{(1/2) \cdot D12 \cdot (NA[-1]')^2\}/(NA[L])^2 \quad \text{Formula (5)}$$

Since the spot diameters r of the diffracted light on the light-receiving devices 32 and 33 on the origin of the S-shaped curve are the same, the following equation is obtained:

$$r/2 = D11 \cdot NA[+1]' \quad \text{Formula (6)}$$
$$= D12 \cdot NA[-1]'$$

Therefore, the following relationship holds true from Formula (6):

$$D11/D12 = NA[-1]'/NA[+1]' \quad \text{Formula (7)}$$

If NA[0]=NA[+1]'=NA[−1]' can be approximated, D11 is equal to D12, and the following equation is obtained from Formulas (4) and (5):

$$d1/d2 = 1 \quad \text{Formula (8)}$$

Thus, the following relationship is obtained between the diffracted light (the +1 order light and the −1 order light) and the 0 order light:

$$NA[+1]' = L/(L-D11) \cdot NA[0] \quad \text{Formula (9)}$$

$$NA[-1]' = L/(L+D12) \cdot NA[0] \quad \text{Formula (10)}$$

If the distance L between the diffraction element 24 and the light-receiving device section 25 is sufficiently large, or if the distances D11 and D12 are sufficiently small, Formula (8) holds true.

If the above-noted approximation does not apply, however, the relationship NA[0]=NA[+1]'=NA[−1]' does not hold true, and Formula (11) rather than Formula (8) is obtained:

$$d1/d2 = (NA[+1]')^2/(NA[-1]')^2 \cdot (D11/D12) \quad \text{Formula (11)}$$

-continued
$$= NA[+1]'/NA[-1]'$$

In this case, an asymmetric in-focus region of the S-shaped curve is exhibited. That is, the in-focus region shown in FIG. 7 is exhibited.

An asymmetric S-shaped curve means instability in gain of a focus servo signal or an asymmetric focus margin, and is disadvantageous in view of the stability in recording to and playback from an optical recording medium.

In a device supporting a high-density recording medium, the objective lens 23 has a high NA. In order to accomplish the same in-focus region d of the S-shaped curve as that described above, as is understood from Formulas 4 and 5, the focal change distance D11 (D12) with respect to the diffraction element 24 must increase as the numerical aperture (NA[L]) of the objective lens 23 increases.

This further results in a greater amount of change in the NA of the diffracted light diffracted by the diffraction element 24 than that of the 0 order light, as is given by Formulas 9 and 10.

In an optical pickup apparatus which includes the objective lens 23 having a high NA, therefore, a more asymmetric in-focus region of the S-shaped curve is exhibited.

Furthermore, desirably, the distance L from the diffraction element 24 to the light-receiving device section 25 should be reduced in order to reduce the size of the optical pickup apparatus.

However, as is understood from Formulas 9 and 10, as the distance L from the diffraction element 24 to the light-receiving device section 25 becomes shorter, the amount of change in the NA of the diffracted light diffracted by the diffraction element 24 becomes greater than that of the 0 order light. Thus, this case also results in a more asymmetric in-focus region of the S-shaped curve.

As described above, an optical pickup apparatus which obtains a focus-error signal by the SSD method using a diffraction element has a problem of such an asymmetric in-focus region of the S-shaped curve.

A noticeably asymmetric in-focus region of the S-shaped curve is exhibited, resulting in a large problem, particularly in an optical pickup apparatus which includes the objective lens 23 having a high NA and in which the distance L from the diffraction element 24 to the light-receiving device section 25 is small, that is, a compact optical pickup apparatus used for high-density optical recording media.

DISCLOSURE OF INVENTION

In view of such a problem, an object of the present invention is to provide an optical pickup apparatus which obtains a focus-error signal by the SSD method, in which a focus-error signal exhibiting a symmetric S-shaped curve can be detected.

To this end, according to the present invention, in an optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, the position of the light-receiving device section is set to the position offset closer to the diffraction element from the focal position of the 0 order light passing through the diffraction element.

Particularly, the position of the light-receiving device section is offset closer to the diffraction element from the focal position of the 0 order light passing through the diffraction element as long as the following relation is satisfied:

$(NA[+1]/NA[-1]) < (D2/D1) \leq (NA[+1]/NA[-1])^2$

Alternatively, the position of the light-receiving device section is offset closer to the diffraction element from the focusing position of the 0 order light passing through the diffraction element so that the following relation is substantially satisfied:

$(D2/D1) = (NA[+1]/NA[-1])^2$

In these cases, NA[+1], NA[−1], D1, and D2 are defined as follows:

NA[+1] indicates the numerical aperture of the +1 order light diffracted by the diffraction element;

NA[−1] indicates the numerical aperture of the −1 order light diffracted by the diffraction element;

D1 indicates the distance from the focal position of the +1 order light diffracted by the diffraction element to the light-receiving device section; and D2 indicates the distance from the focal position of the −1 order light diffracted by the diffraction element to the light-receiving device section.

The light-receiving device section includes a light-receiving device corresponding to the +1 order diffracted light, and a light-receiving device corresponding to the −1 order diffracted light, each being divided into three or five light-receiving regions, and the width of the center light-receiving region of the light-receiving device corresponding to the +1 order diffracted light is different in size from the width of the center light-receiving region of the light-receiving device corresponding to the −1 order diffracted light in order to compensate for a deviation between the focal position on the optical recording medium and the position of the origin of the focus-error signal.

Particularly, the ratio of the width (s1) of the center light-receiving region of the light-receiving device corresponding to the +1 order diffracted light to the width (s2) of the center light-receiving region of the light-receiving device corresponding to the −1 order diffracted light is substantially set as follows:

$s1:s2 = (D1/NA[-1]):(D2/NA[+1])$

Alternatively, the ratio of the width (s1) of the center light-receiving region of the light-receiving device corresponding to the +1 order diffracted light to the width (s2) of the center light-receiving region of the light-receiving device corresponding to the −1 order diffracted light is substantially set as follows:

$s1:s2 = NA[-1]:NA[+1]$

According to the present invention, therefore, the position of the light-receiving device section is offset closer to the diffraction element from the focal position of the 0 order light passing through the diffracted light, thereby correcting for an asymmetric shape of the focus-error signal (S-shaped signal).

Furthermore, a deviation between the focal position with respect to the optical recording medium and the origin of the S-shaped curve of the focus-error signal when the light-receiving device section is offset is overcome by making the width of the center light-receiving region of three or five divided light-receiving regions of the light-receiving device corresponding to the +1 order diffracted light different in size from that of the light-receiving device corresponding to the −1 order diffracted light.

BEST MODE FOR CARRYING OUT THE INVENTION

An optical pickup apparatus of an embodiment of the present invention is described below.

Figure 1:
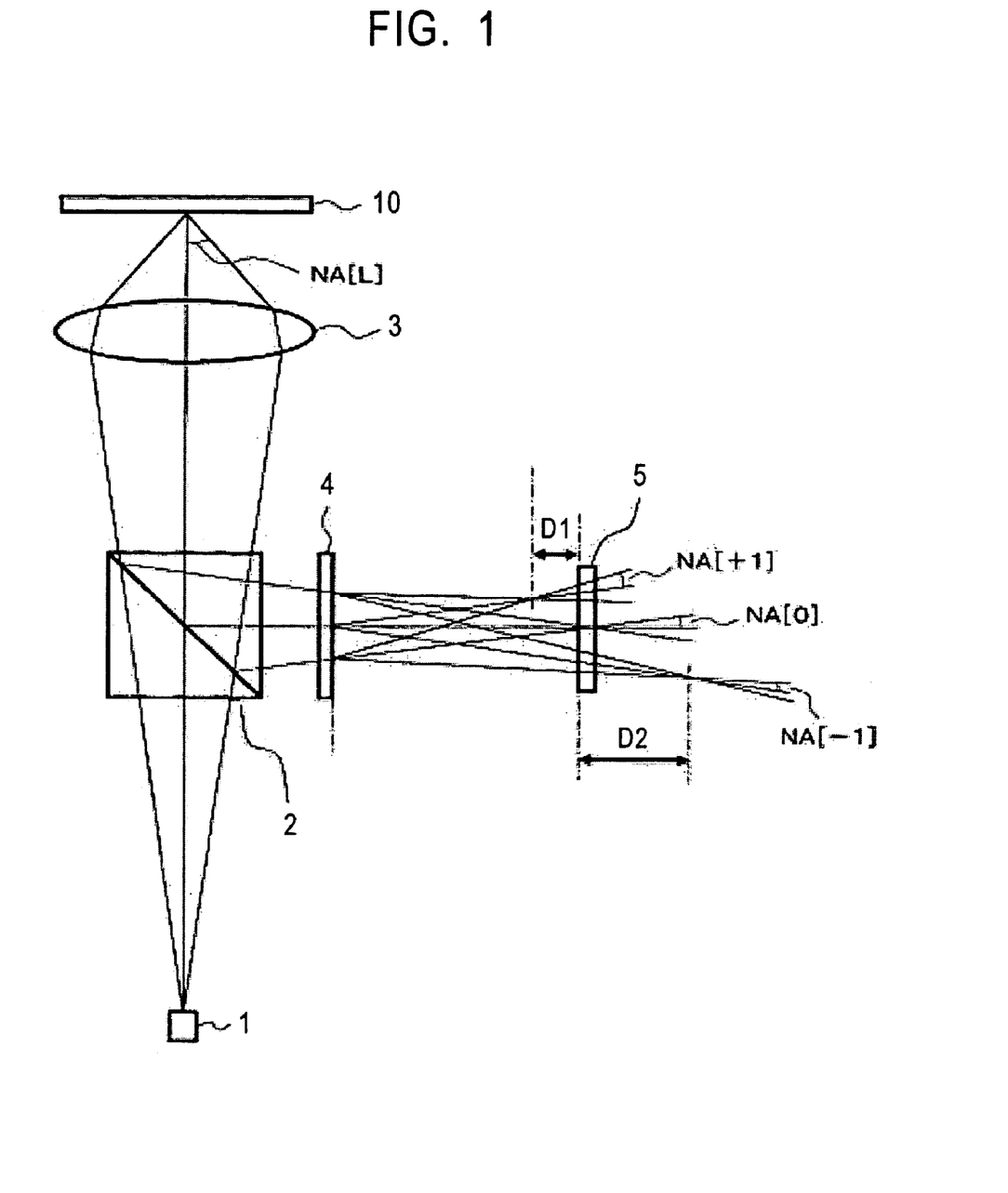
FIG. 1 is a diagram illustrating the structure of an optical pickup apparatus according to an embodiment of the present invention.

FIG. 1 illustrates an example structure of an optical pickup apparatus of an embodiment of the present invention for detecting a focus-error signal by an SSD method.

A laser beam emitted from a laser light source 1 such as a laser diode reaches an objective lens 3 through a beam splitter 2, and is irradiated via the objective lens 3 onto an information recording surface of an optical recording medium 10 such as an optical disc.

The light reflected from the optical recording medium 10 returns to the beam splitter 2 through the objective lens 3, the optical path thereof being slit by the beam splitter 2, and is directed to a diffraction element 4.

The reflected light is divided by the diffraction element 4 into the 0 order light passing therethrough, +1 order light (diffracted light) and −1 order light (diffracted light) diffracted by the diffraction element 4.

The 0 order light, the +1 order light, and the −1 order light reach a light-receiving device section 5.

Particularly in the optical pickup apparatus of this embodiment, the light-receiving device section 5 is positioned so as to be offset closer to the diffraction element 4 than the related art unit shown in FIG. 6, as is described below.

Figure 3:
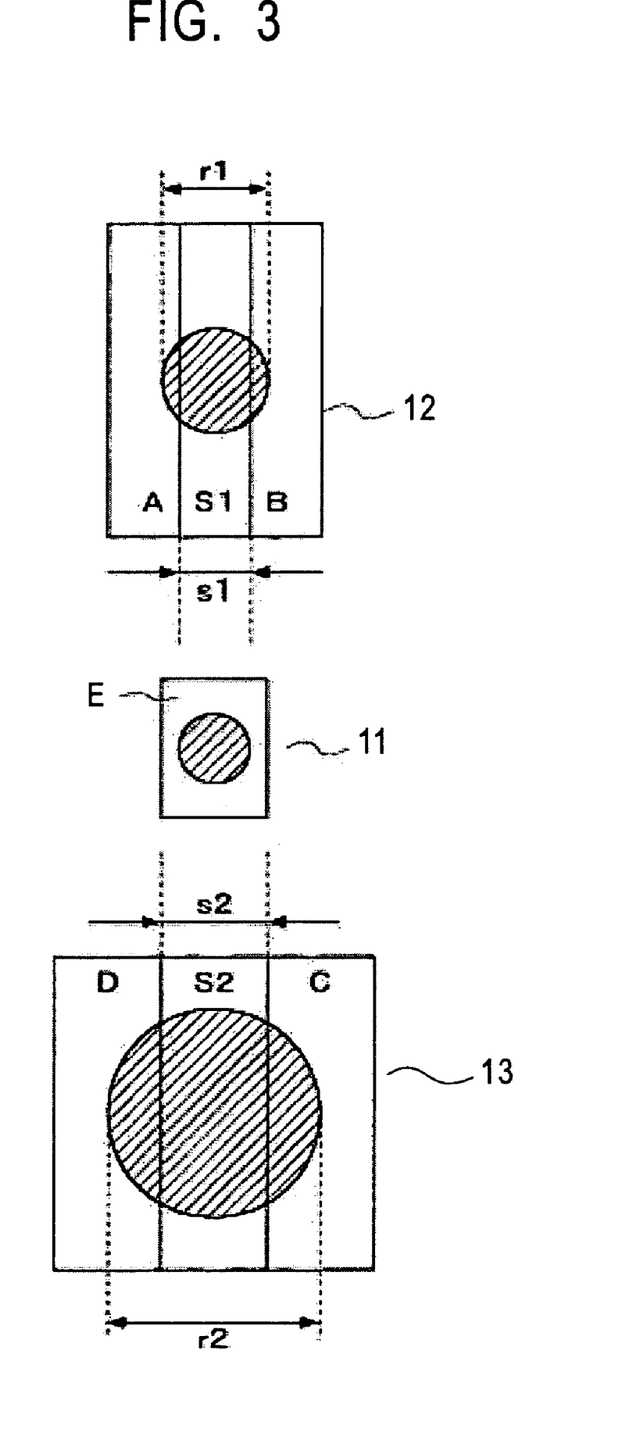
FIG. 3 is a diagram illustrating a light-receiving device in a light-receiving device section of the optical pickup apparatus of the embodiment.

In the light-receiving device section 5, for example, light-receiving patterns shown in FIG. 3 are formed.

A light-receiving device 11 has a light-receiving region E corresponding to the 0 order light.

A light-receiving device 12 has three divided light-receiving regions A, S1, and B, and corresponds to the +1 order light.

A light-receiving device 13 also has three divided light-receiving regions C, S2, and D, and corresponds to the −1 order light.

Each of the light-receiving regions E, A, S1, B, C, S2, and D of the light-receiving devices 11, 12, and 13 outputs an electrical signal having a current level corresponding to the light intensity of the incident light.

The electrical signal output from each of the light-receiving devices 11, 12, and 13 is supplied to a matrix amp (not shown) for processing, such as current-to-voltage conversion, amplification, and matrix calculation, thereby generating a required signal.

That is, a playback signal, focus-error signal, tracking error signal, etc., corresponding to the information recorded in the optical recording medium 10 are generated.

The objective lens 3 is held by a two-axis mechanism (not shown) having a focus coil and a tracking coil so as to be displaceable in the near-and-apart direction with respect to the optical recording medium 10 (focusing direction) and in the direction transverse to the track orientation of the optical recording medium (tracking direction).

A focus drive signal is generated by a servo circuit (not shown) based on the focus-error signal to drive the focus coil of the two-axis mechanism, so that the objective lens 3 is driven in the focusing direction so as to be focused with respect to the optical recording medium 10.

A tracking drive signal is further generated by the servo circuit based on the tracking error signal to drive the tracking coil of the two-axis mechanism, so that the objective lens 3 is driven in the tracking direction so as to track with respect to the optical recording medium 10.

In the SSD method, the focus-error signal is generated according to the spot size of the diffracted light, and, as is similar to the related art, the focus-error signal is generated by, in the subsequent matrix amp, calculating (A+B+S2)−(C+D+S1) on the outputs of the light-receiving regions A, S1, B, C, S2, and D.

That is, the principle is also used in which the spot size of the +1 order light incident on the light-receiving device 12 and the spot size of the −1 order light incident on the light-receiving device 13, which vary depending upon the focusing conditions (focused/defocused), are utilized.

In this example, however, because of offset of the light-receiving device section 5, the spot size of the +1 order light incident on the light-receiving device 12 is not equivalent to the spot size of the −1 order light incident on the light-receiving device 13 in the focused state.

Thus, as shown in FIG. 3, the light-receiving device 12 and the light-receiving device 13 have different sizes. More specifically, the light-receiving regions S1 and S2 each constituting the center region of the three divided light-receiving regions are designed so as to have different widths in the division direction. This meaning is also described below.

Figure 2:
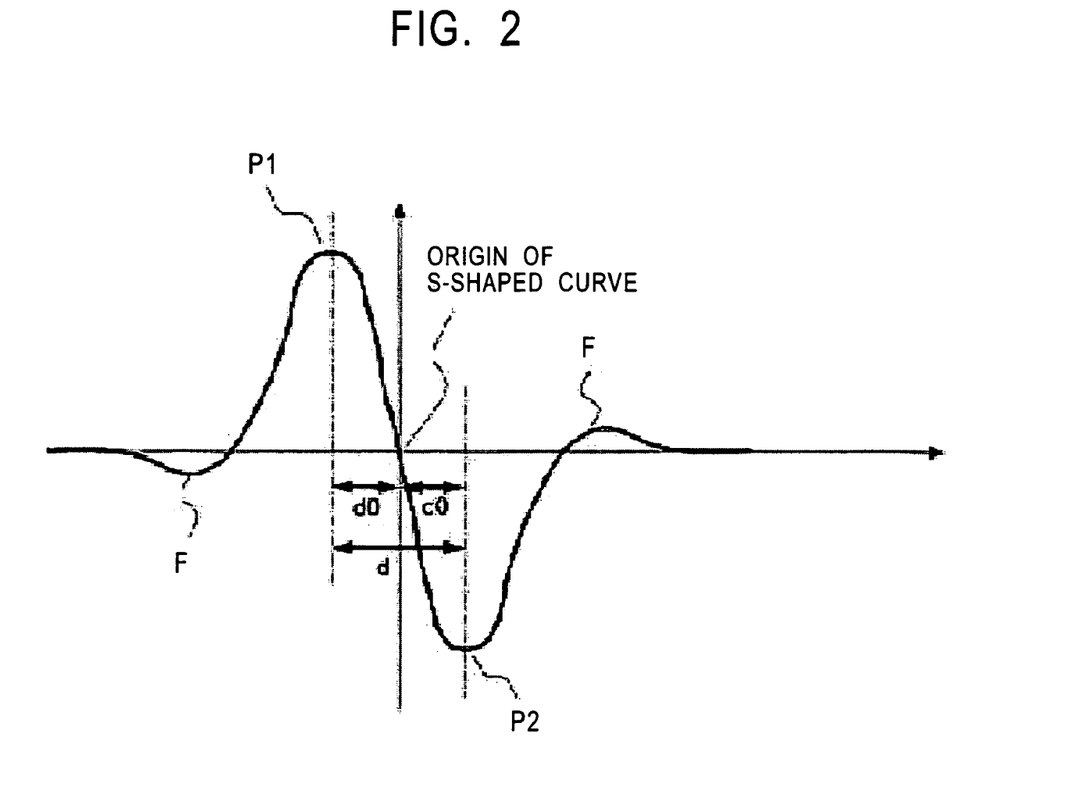
FIG. 2 is a diagram illustrating a focus-error signal obtained by the optical pickup apparatus of the embodiment.

In this example, the focus-error signal exhibiting an S-shaped curve shown in FIG. 2 is observed.

As is understood from comparison between FIG. 2 and FIG. 7, in this example, a symmetric S-shaped curve (symmetric S-curve in-focus region) is obtained.

As is similar to the case shown in FIG. 7, it is assumed that the distance of the in-focus region of the S-shaped signal is indicated by d. In other words, "d" is defined as the displacement distance of the optical recording medium (the distance by which the optical recording medium changes with respect to the position of the objective lens) when the S-shaped signal varies from the peak P1 to the peak P2.

In this example shown in FIG. 2 where the symmetry of the S-curve in-focus region is improved, one-side in-focus regions of the S-shaped curve with respect to the origin of the S-shaped curve are equivalent, and are indicated by d0.

Thus, d0=d/2 is obtained.

A description is made below with terminology defined as follows:

NA[+1] indicates the NA of the +1 order light caused by the diffraction element 4;

NA[−1] indicates the NA of the −1 order light caused by the diffraction element 4;

NA[0] indicates the NA of the 0 order light passing through the diffraction element 4;

NA[L] indicates the NA of the objective lens 3;

D1 indicates the distance from the focal position of the +1 order light diffracted by the diffraction element 4 to the light-receiving device section 5;

D2 indicates the distance from the focal position of the −1 order light diffracted by the diffraction element 4 to the light-receiving device section 5;

s1 indicates the width of the center light-receiving region S1 of the light-receiving device 12 corresponding to the +1 order light;

s2 indicates the width of the center light-receiving region S2 of the light-receiving device 13 corresponding to the −1 order light;

r1 indicates the spot diameter of the +1 order light reaching the light-receiving device 12; and r2 indicates the spot diameter of the −1 order light reaching the light-receiving device 13.

In order to exhibit a symmetric S-curve in-focus region, there is a need for design in which each one-side in-focus region d0 of the S-shaped curve is equal to d/2, as shown in FIG. 2.

When the diffracted light (the +1 order light and the −1 order light) is converted by the diffraction element 4 to NA[+1] and NA[−1], respectively, the focal change distances D1 and D2 of the diffracted light required for achieving the one-side in-focus region d0(=d/2) of the S-shaped curve are given by the following formulas:

$$D1 = 2d0 \cdot (NA[L])^2 / (NA[+1])^2 \}$$ Formula (12)

$$D2 = 2d0 \cdot (NA[L])^2 / (NA[-1])^2 \}$$ Formula (13)

From the above relationship, the region is determined as follows:

$$d0 = (1/2) \cdot D1 \cdot (NA[+1])^2 (NA[L])^2$$ Formula (14)

$$= (1/2) \cdot D2 \cdot (NA[-1])^2 (NA[L])^2$$

The ratio of the focal change distances D1 to D2 is determined as follows:

$$D1/D2 = (NA[-1]/NA[+1])^2$$ Formula (15)

In the related art, as described in Formula (7), the focal change distance ratio (D11/D12 ratio) corresponding to the D1/D2 ratio is given by NA[−1]'/NA[+1]'; whereas, in this example, the light-receiving device section 5 is corrected (offset) so as to be closer to the diffraction element 4 from to the focal position of the 0 order light so that the position relationship expressed by Formula (15) is established, thereby improving the symmetry of the S-curve in-focus region.

Thus, while the position relationship of the related art is expressed by D1/D2=NA[−1]/NA[+1], the position of the light-receiving device section 5 is offset closer to the diffraction element 4 from the original focal position of the 0 order light as long as the following relationship holds true:

$$NA[+1]/NA[-1] < (D2/D1) \leq (NA[+1]/NA[-1])^2$$

This allows the one-side S-curve in-focus regions of the S-shaped signal to become closer to d0 and d0 shown in FIG. 2 than d1 and d2 shown in FIG. 7. This means that the symmetry of the S-curve in-focus region is improved.

Since Formula (15), i.e., $D1/D2=(NA[-1]/NA[+1])^2$ is derived based on $d0\theta=d/2$, the D1/D2 ratio is substantially equal to the position relationship $(NA[-1]/NA[+1])^2$ (where the light-receiving device section 5 is offset), thereby optimizing the symmetry of the S-curve in-focus region.

The improvement in symmetry of the S-curve in-focus region achieves stable gain of the focus servo signal or a symmetric focus margin, and therefore achieves stable recording to and playback from the optical recording medium.

As described above, a noticeably asymmetric S-curve in-focus region is exhibited particularly in an optical pickup apparatus supporting high-density recording media or a compact optical pickup apparatus. By offsetting the light-receiving device section 5 for improvement in symmetry, an optical pickup apparatus suitable for such purposes can be realized.

The spot diameters r1 and r2 of the diffracted light (the +1 order light and the −1 order light) reaching the light-receiving devices 12 and 13 when focused with respect to the optical recording medium 10 are determined as follows, respectively:

$$r1=2 \cdot D1 \cdot NA[+1] \quad \text{Formula (16)}$$

$$r2=2 \cdot D2 \cdot NA[-1] \quad \text{Formula (17)}$$

In the standard SSD method, the diffracted light (the +1 order light and the −1 order light) diffracted by the diffraction element 4 has the same spot size on the light-receiving devices 12 and 13 when focused with respect to the optical recording medium 10, and the following relationship is obtained:

$$r1/r2=1 \quad \text{Formula (18)}$$

Thus, the diffracted light is divided at the same ratio by the light-receiving devices for signal calculation according to the SSD method, so that the origin of the S-shaped curve coincides with the focal position on the optical recording medium 10.

In this example, on the other hand, when the optical recording medium 10 is located at the focal position, the spot diameter ratio of the diffracted light diffracted by the diffraction element 4 on the light-receiving devices 12 and 13 is given as follows from Formulas (16) and (17), and (12) and (13):

$$r1/r2 = D1 \cdot NA[+1]/D2 \cdot NA[-1] \quad \text{Formula (19)}$$

$$= NA[-1]/NA[+1]$$

In this case, there occurs a deviation between the focal position on the optical recording medium and the origin of the S-shaped curve if the light is divided on the light-receiving devices 12 and 13 according to the standard method.

In this example, therefore, as shown in FIG. 3, the width ratio s1/s2 of the center light-receiving regions S1 and S2 of the light-receiving devices 12 and 13 which the diffracted light reaches is defined as follows:

$$s1/s2=NA[-1]/NA[+1] \quad \text{Formula (20)}$$

or $$s1/s2=D1 \cdot NA[+1]/D2 \cdot NA[-1] \quad \text{Formula (21)}$$

In FIG. 3, the 0, +1, and −1 order light spots are indicated by round hatched portions on the light-receiving devices 11, 12, and 13, respectively. Since the position of the light-receiving device section 5 is offset closer to the diffraction element 4 from the focal position of the 0 order light, in the focused state, the spot sizes of the diffracted light irradiated onto the light-receiving devices 12 and 13 differ from each other, as shown in FIG. 3. Thus, if the light-receiving devices 32 and 33 shown in FIG. 8 are used, the focus-error signal obtained by calculating (A+B+S2)−(C+D+S1) is not at the zero level (origin of the S-shaped curve) in the focused state.

Since the ratio of the division-direction widths s1 to s2 of the center light-receiving regions S1 and S2 of the three divided regions of the light-receiving devices 12 and 13 shown in FIG. 3 is designed herein so as to substantially satisfy Formula (20) or (21), the focus-error signal obtained by calculating (A+B+S2)−(C+D+S1) is at the zero level (origin of the S-shaped curve) in the focused state. In other words, the light intensities of the light detected at the light-receiving regions S1 and S2 are equivalent even if the spot sizes differ from each other.

By designing the light-receiving devices 12 and 13 in this fashion, the focus-error signal can be obtained by calculating (A+B+S2)−(C+D+S1) according to the standard SSD method although the detected spot sizes of the diffracted light appear to differ from each other in the focused state. Thus, there is no change in design of circuits such as a subsequent matrix amp.

Figure 4:
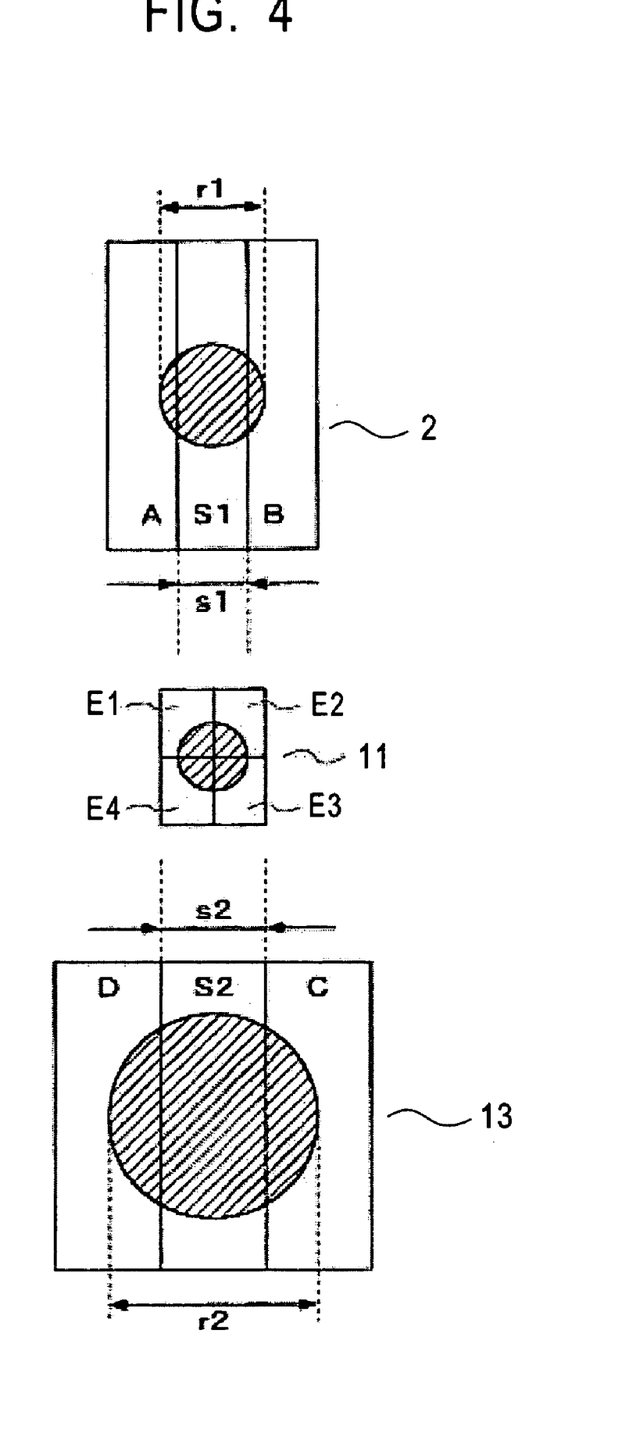
FIG. 4 is a diagram illustrating a modification of the light-receiving device section of the embodiment.

FIG. 4 shows a modification example of the light-receiving devices of the light-receiving device section 5. This example indicates that the light-receiving device 11 corresponding to the 0 order light is divided into four detector portions.

As described above, the light-receiving device section 5 is offset closer to the diffraction element 4 from the focal position of the 0 order light. This also means that the 0 order light incident on the light-receiving device 11 for the 0 order light has a larger spot size. Thus, even in the case where the light-receiving device 11 is a four-division light-receiving device having light-receiving regions E1, E2, E3, and E4, suitable light detection can be performed in the light-receiving regions E1, E2, E3, and E4.

Since the light-receiving device 11 is a four-division light-receiving device, a so-called push-pull signal or tracking error signal can be detected by the light-receiving device 11 for the 0 order light.

The push-pull signal is detected as wobble information when the optical recording medium 10 is, for example, an optical disc having wobbled grooves formed therein. In some cases, the tracking error signal may be generated from the push-pull signal.

Such a push-pull signal is obtained by, for example, calculating (E1+E4)−(E2+E3) on the output of the four-division light-receiving device 11.

The four-division light-receiving device 11 can also be used to obtain a tracking error signal by a so-called DPD (Differential Phase Detection). In this case, a signal (E1+E3) and a signal (E2+E4) are obtained from the output of the light-receiving device 11. The phase error between the signal (E1+E3) and the signal (E2+E4) is detected to generate a tracking error signal as a value corresponding to the phase error.

Figure 5:
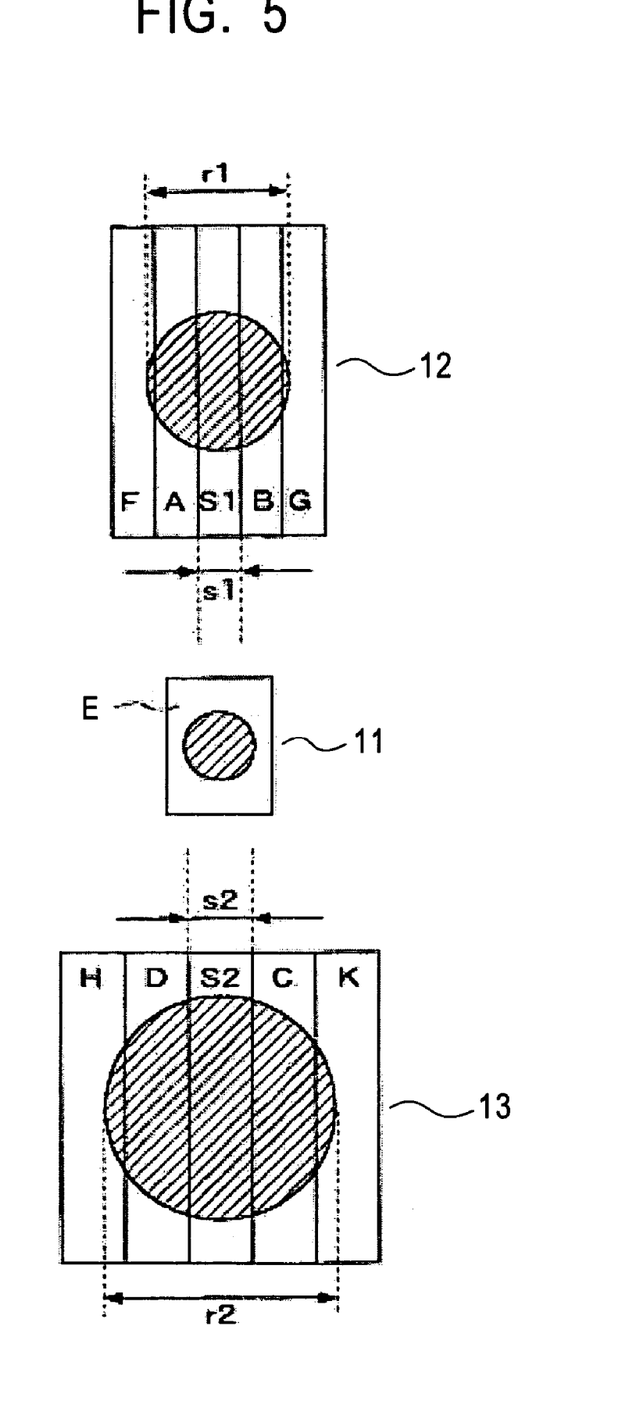
FIG. 5 is a diagram illustrating a modification of the light-receiving device section of the embodiment.

FIG. 5 shows an example where each of the light-receiving devices 12 and 13 of the light-receiving device section 5 is divided into five detector portions.

In this case, the light-receiving device 12 has five light-receiving regions F, A, S1, B, and G. The light-receiving device 13 has five light-receiving regions H, D, S2, C, and K.

In the SSD method, in some cases, the five-division light-receiving devices 12 and 13 may be used to obtain a focus-error signal. In such cases, the focus-error signal is obtained by calculating {(S1+F+G)+C+D}−{(S2+H+K)+A+B} on the outputs of the light-receiving devices 12 and 13.

In such cases, also, since the width ratio s1/s2 of the center light-receiving regions S1 and S2 is designed so as to substantially satisfy above-described Formula (20) or (21) according to the offset of the light-receiving device section 5, the focus-error signal obtained by calculating {(S1+F+G)+C+D}−{(S2+H+K)+A+B} is at the zero level (origin of the S-shaped curve) in the focused state.

Originally, such a five-division detector is used for the purpose of reduction of fake portions F of the focus-error signal shown in FIG. 2.

However, an asymmetric S-shaped curve as exhibited in the related art prevents a reduction of one fake portion. In this example, on the other hand, the light-receiving device section 5 is offset so as to exhibit a symmetric S-shaped curve, thereby, advantageously, increasing the fake reduction effect by using the five-division detector.

The optical pickup apparatus of an embodiment has been described; however, various modifications may be made to the configuration of the optical pickup apparatus, particularly to the type or number of optical devices, etc.

The optical pickup apparatus of the present invention may be incorporated into a recording device and playback device compatible with various optical recording media such as optical discs, magneto-optical discs, and optical cards. Such an optical pickup apparatus is suitable particularly for incorporation into a device supporting high-density optical recording media.

As is understood from the foregoing description, according to the optical pickup apparatus of the present invention, the light-receiving device section is located at the position offset a predetermined amount closer to the diffraction element from the focal position of the 0 order light, thereby improving the S-shaped signal symmetry of a focus-error signal detected by the SSD method.

This results in stable gain of the focus-error signal and stable recording and playback operation of the optical recording medium. The S-shaped signal having symmetry allows for a symmetric focus margin. Thus, the overall focus margin increases, thereby also achieving stable recording and playback operation of the optical recording medium.

Another advantage is that the distance between the diffraction element and the light-receiving device section can consequently be reduced. Therefore, desirably, the size of the optical pickup apparatus is reduced.

The asymmetry of the S-shaped signal is noticeable particularly in an optical pickup apparatus supporting high-density optical recording media using a high-NA objective lens or a compact optical pickup apparatus. However, the asymmetry of the S-shaped signal in such a case can be overcome by the optical pickup apparatus of the present invention, thus, desirably, achieving an optical pickup apparatus for the purpose of high-density recording and playback.

The width of the center light-receiving region of the light-receiving device corresponding to the +1 order diffracted light is different in size from the width of the center light-receiving region of the light-receiving device corresponding to the −1 order diffracted light in order to compensate for a deviation between the focal position on the optical recording medium and the position of the origin of the focus-error signal. There arises still another advantage in that a deviation caused between the focal position with respect to the optical recording medium and the origin of the S-shaped curve of the focus-error signal even when the light-receiving device section is offset can be overcome, and the focus-error signal can be obtained using a similar calculation method to the standard method, whereby there is no need for a configuration modification of a subsequent calculation circuit.

The invention claimed is:

1. An optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, wherein the position of the light-receiving device section is set to the position offset closer to the diffraction element from the focal position of the 0 order light passing through the diffraction element, and wherein the position of the light-receiving device section is offset closer to the diffraction element from the focal position of the 0 order light passing through the diffraction element as long as the following relation is satisfied:

$$(NA[+1]/NA[-1]) < (D2/D1) \leq (NA[+1]/NA[-1])^2$$

where NA[+1] indicates the numerical aperture of the +1 order light diffracted by the diffraction element;

NA[−1] indicates the numerical aperture of the −1 order light diffracted by the diffraction element;

D1 indicates the distance from the focal position of the +1 order light diffracted by the diffraction element to the light-receiving device section; and D2 indicates the distance from the focal position of the −1 order light diffracted by the diffraction element to the light-receiving device section.

2. An optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, wherein the position of the light-receiving device section is set to the position offset closer to the diffraction element from the focal position of the 0 order light passing through the diffraction element, and wherein the position of the light-receiving device section is offset closer to the diffraction element from the focal position of the 0 order light passing through the diffraction element so that the following relation is substantially satisfied:

$$(D2/D1) = (NA[+1]/NA[-1])^2$$

where NA[+1] indicates the numerical aperture of the +1 order light diffracted by the diffraction element;

NA[−1] indicates the numerical aperture of the −1 order light diffracted by the diffraction element;

D1 indicates the distance from the focal position of the +1 order light diffracted by the diffraction element to the light-receiving device section; and D2 indicates the distance from the focal position of the −1 order light diffracted by the diffraction element to the light-receiving device section.

3. An optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, wherein the position of the light-receiving device section is set to the position offset closer to the diffraction element from the focal position of the 0 order light passing through the diffraction element, and wherein the light-receiving device section includes a light-receiving device corresponding to the +1 order light diffracted by the diffraction element, and a light-receiving device corresponding to the −1 order light diffracted by the diffraction element, each being divided into at least three light-receiving regions, and the width of the center light-receiving region of the light-receiving device corresponding to the +1 order diffracted light is different in size from the width of the center light-receiving region of the light-receiving device corresponding to the −1 order diffracted light in order to compensate for a deviation between the focal position on the optical recording medium and the position of the origin of the focus-error signal, wherein the ratio of the width (s1) of the center light-receiving region of the light-receiving device corresponding to the +1 order diffracted light to the width (s2) of the center light-receiving region of the light-receiving device corresponding to the −1 order diffracted light is substantially set as follows:

$$s1:s2=(D1/NA[-1]):(D2/NA[+1])$$

where NA[+1] indicates the numerical aperture of the +1 order light diffracted by the diffraction element;

NA[−1] indicates the numerical aperture of the −1 order light diffracted by the diffraction element;

D1 indicates the distance from the focal position of the +1 order light diffracted by the diffraction element to the light-receiving device section; and D2 indicates the distance from the focal position of the −1 order light diffracted by the diffraction element to the light-receiving device section.

4. An optical pickup apparatus for irradiating laser light onto an optical recording medium and for directing the light reflected from at least the optical recording medium to a light-receiving device section through a diffraction element to detect a focus-error signal by a spot size detection method using diffracted light caused by the diffraction element, wherein the position of the light-receiving device section is set to the position offset closer to the diffraction element from the focal position of the 0 order light passing through the diffraction element, and wherein the light-receiving device section includes a light-receiving device corresponding to the +1 order light diffracted by the diffraction element, and a light-receiving device corresponding to the −1 order light diffracted by the diffraction element, each being divided into at least three light-receiving regions, and the width of the center light-receiving region of the light-receiving device corresponding to the +1 order diffracted light is different in size from the width of the center light-receiving region of the light-receiving device corresponding to the −1 order diffracted light in order to compensate for a deviation between the focal position on the optical recording medium and the position of the origin of the focus-error signal, wherein the ratio of the width (s1) of the center light-receiving region of the light-receiving device corresponding to the +1 order diffracted light to the width (s2) of the center light-receiving region of the light-receiving device corresponding to the −1 order diffracted light is substantially set as follows:

$$s1:s2=NA[-1]:NA[+1]$$

where NA[+1] indicates the numerical aperture of the +1 order light diffracted by the diffraction element; and NA[−1] indicates the numerical aperture of the −1 order light diffracted by the diffraction element.

* * * * *